March 23, 1965 O. TARABORRELLI 3,174,755

PHONOGRAPH PICKUP-CARRYING ASSEMBLY

Filed Oct. 8, 1962

INVENTOR.
ORLANDO TARABORRELLI

BY Albert H. Sharland

ATTORNEY

United States Patent Office 3,174,755
Patented Mar. 23, 1965

3,174,755
PHONOGRAPH PICKUP-CARRYING ASSEMBLY
Orlando Taraborrelli, Bryn Mawr, Pa., assignor to Philco Corporation, Philadelphia, Pa., a corporation of Delaware
Filed Oct. 8, 1962, Ser. No. 229,050
5 Claims. (Cl. 274—23)

The present invention relates to phonograph apparatus, and particularly to phonograph tone arms for pickups of the type which are adapted for high fidelity sound reproduction.

More specifically, the invention has to do with improvements in the construction and operation of a tone arm having the above stated characteristics and for use with automatic phonographs wherein a plurality of records supported above a turntable are successively dropped to playing position on the turntable.

Generally, a pickup of the above mentioned type is designed to operate at low stylus pressure, that is to say at or near the minimum pressure required for the pickup stylus to track the modulated groove of the record being played. Moreover, to insure high-fidelity reproduction, it is important that the stylus remain at all times in properly seated engagement within the record groove without noticeable variation in the pressure with which the stylus engages the groove. To fulfill these requirements the tone arm which carries the pickup must be able to undergo oscillatory motion in directions both parallel with and normal to the playing surface of the record so as to allow the pickup to move freely in response to undulous displacements brought about by an eccentric or warped record. Furthermore, in order that the tone arm may be used effectively in automatic record-changing phonographs of the hereinbefore mentioned variety, the tone arm must be able to support the pickup so that it properly engages and adequately tracks each of the records in playing position even though the level at which the individual records are played varies with the stacking of the records on the turntable. It is also desirable that the tone arm be adapted for placement in a raised position perpendicular to the turntable so as to expose and afford access to the tone arm mounting structure and pickup suspending means for inspection, adjustment, and repair or replacement of parts.

Beyond satisfying these general requirements, the tone arm of the invention is such that the phonograph can be played in a variety of positions, for example with the plane of the turntable extending vertically, and can be used with a phonograph which is adapted to play in moving vehicles.

Among the most serious problems and difficulties encountered in a tone arm devised to meet the above-noted requirements are those which involve the provision of means to compensate for inertial forces which tend to move the pickup stylus out of the record groove, and means to neutralize pickup dislocating forces produced by tilting of the phonograph to off-level positions. In attempting to solve and overcome these problems and difficulties, it has been proposed to design tone arms with counterbalancing and counterrotating means. However, tone arms constructed as heretofore proposed have bene found unsatisfactory for use with automatic record-changing phonographs or under the severe conditions mentioned above. If adaptable to such uses, they have been considered too complicated or expensive for commercial acceptance.

Accordingly, it is a primary object of this invention to provide a novel tone arm construction which meets the requirements necessary to high fidelity reproduction of sound under a variety of adverse coniditions, and which performs equally well whether the record being played rests directly on the turntable or on top of other records supported by the turntable.

It is also an object of the invention to provide a tone arm which is characterized by the simplicity and inexpensiveness of its structure, and which can readily be incorporated in an automatic record-changing phonograph without material alterations in its basic structure.

Another and more specific object of the invention resides in the provision of a tone arm which insures proper tracking of the pickup stylus in a record groove regardless of the position of the phonograph.

A noteworthy feature of the invention is that a phonograph equipped with the improved tone arm can readily be mounted at an angle with respect to the horizontal so that the space needed within a cabinet to accommodate the phonograph can be considerably reduced.

In a preferred embodiment, the objectives and features of the invention are obtained by associating a tone arm and a support member in such a manner that the tone arm is adapted for balanced swinging movement with the support member about one of a pair of perpendicularly related pivot means provided in a hinge structure between the support member and the carrying base, and is also adapted for balanced rocking motion about a third pivot means provided by a connection between the support member and the tone arm. In accordance with this preferred embodiment, the mentioned one or first pivot means is carried by the base whereas the other or second pivot means is connected to the support member, and the balanced swinging movement of the support member and tone arm about the first pivot means is obtained by mounting counterweight means on the support member. In further accordance with the preferred embodiment, the third pivot means between the support member and tone arm is disposed at an end portion thereof which is associated with the support member, and the balanced rocking motion of the tone arm on the third pivot means is obtained by mounting another or second counterweight means on the aforesaid end portion of the tone arm. Resilient means between the support member and the tone arm can serve to bias the latter so as to assure that the pickup carried by the tone arm will engage the record groove at desired stylus pressure. The support member can and preferably is constructed to house the three pivot means, the mentioned first and third pivot means being disposed adjacent a forward portion of the housing support, and the second pivot means being disposed adjacent a rearward portion of said housing.

The full nature of the invention will be more clearly understood from the following description based on the accompanying drawing, in which.

Figure 1:
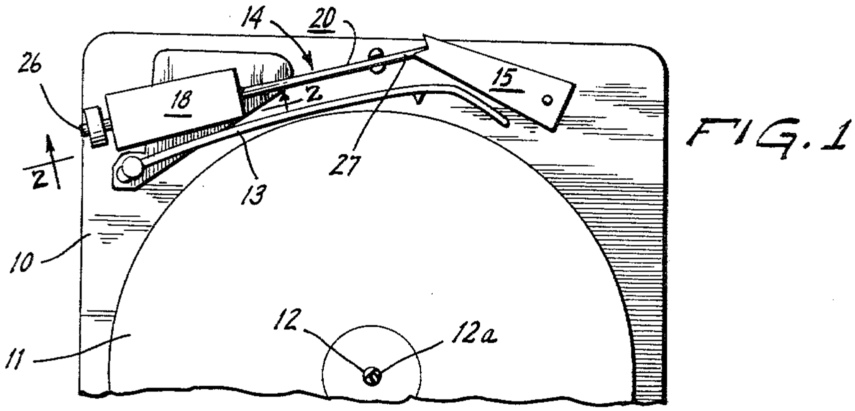
FIGURE 1 is a plan view of a portion of an automatic record-changing phonograph embodying the invention.

With more particular reference to the drawing, FIGURE 1 illustrates the essential parts of a phonograph to which the invention is applied. As shown, the phonograph is of the type adapted to change records automatically and includes a mounting panel or base 10 which serves to support the various parts. A turntable 11 is rotatably mounted on the base 10 to hold and rotate the records during the playing thereof, and a central spindle 12 is adapted to center the records and retain them on the turntable. As is customary, the spindle 12 is also adapted to support a stack of records at an elevated level above the turntable and is provided with conventional pusher means 12*a* operable to effect release of the lowermost record in the supported stack so that one record drops to playing position on the turntable at each record-changing cycle.

As is also customary, an overarm 13 is arranged on the base 10 for manual placement in a position to overlie and stabilize the records on the turntable, and a pickup-carrying assembly 14 including a pickup 15 is mounted on the base and is operable to swing in directions generally parallel to the record supporting surface of the turntable and to pivot in directions perpendicular to said surface so that the usual stylus (not shown) of the pickup can be brought into engagement with and follow the modulated groove of the record placed in playing position on the turntable. A pusher rod 16 in engagement with adjustable abutment means 16*a* serves, during the record-changing cycles, to lift the pickup-carrying assembly in its perpendicular movements, and a bell crank lever system 17 (specific elements of which will be described hereinafter) is operable during such cycles to swing said assembly. Automatic cycling mechanisms suitable for operating the turntable 11, the pusher means 12*a*, the pusher rod 16 and the lever system 17 are well known in the art and, since such mechanisms form no part of the present invention, they have not been illustrated and need not be explained herein. The invention as above indicated particularly concerns the pickup-carrying assembly 14 which will now be described.

In the illustrated embodiment, the pickup-carrying assembly includes a support member 18 and a tone arm 20. As shown the support member 18 is in the form of an inverted box or shell constituting a generally rectangular housing having a top wall 21, two sides walls 22, an open rearward portion 23 and a forward wall 24, the latter being provided with an aperture 25. The tone arm 20 is in the form of an elongated tubular section and has a rearward end portion 26 and a forward end portion 27, the latter being connected to and carrying the pickup 15. The rearward portion 26 of the tone arm is disposed for association with the support member 18, and, as best seen in FIGURES 2 and 3, passes through the aperture 25 in the forward wall 24 of the support member and terminates adjacent the open rearward portion 26 of said member, preferably at a short distance therefrom.

Figure 2:
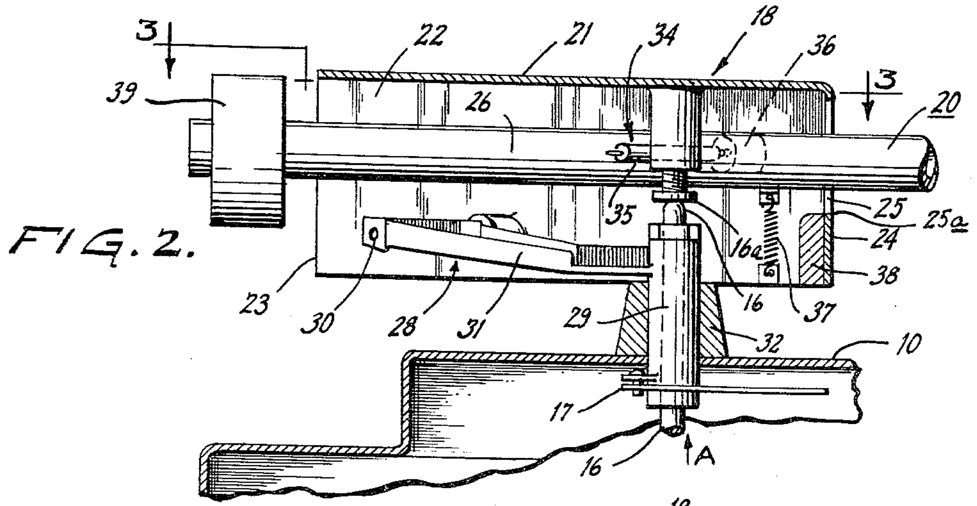
FIGURE 2 is an enlarged longitudinal sectional view taken substantially on line 2—2 of FIGURE 1.
Figure 3:
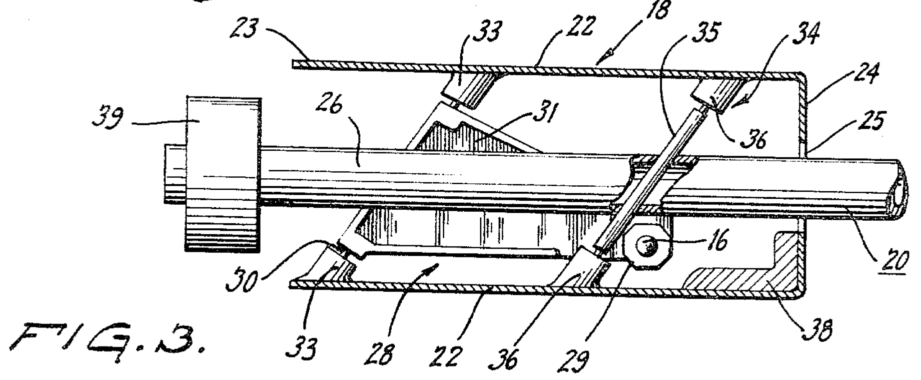
FIGURE 3 is a longitudinal sectional view taken below the top wall of the support member and looking in the general direction of arrows 3—3 of FIGURE 2, the mounting base and the abutment means on said wall to effect lifting of the pickup-carrying assembly being removed for clarity of illustration.

Also as best seen in FIGURES 2 and 3, a hinge structure 28 including a pair of perpendicularly related pivot means 29 and 30 associated with a rigid plate 31 serves to mount the support member for its swinging movements with respect to the base 10. For that purpose, the first pivot means 29 is carried by the base which has a bearing 32 constructed to receive said first pivot means for rotation therein, and the second pivot means 30 is connected to the support member 18 through the intermediation of sockets 33 on the side walls 22 of the support member. The first pivot means is in the form of a hollow sleeve and slidably receives the hereinbefore mentioned pusher rod 16. A connection 34, providing third pivot means 35 in engagement with sockets 36 on the side walls 22 of the support member 18, interconnects the tone arm 20 with the support member so that the tone arm 20 is free to rock with respect to said member. As shown in FIGURE 2, resilient means such as a light spring 37 is attached to the support member 18 and tone arm 20. This resilient means or spring is located between the first pivot means 29 and the forward wall 24 of the support member, and is employed to exert on the tone arm a predetermined slight biasing force which ensures that the pickup will engage a record groove with the desired stylus pressure.

The pickup-carrying assembly is balanced and for that purpose a first counterweight 38 is mounted on the support member 18, and a second counterweight 39 is mounted on the tone arm 20. As illustrated in FIGURES 2 and 3 the first counterweight 38 is arranged in the vicinity of the first pivot means and at the corner defined by adjacent portions of the forward wall 24 and one of the side walls 22 of the support member 18. Thus the first counterweight 38 effectively acts to balance the support member together with the tone arm about the first pivot means 29. The second counterweight 39 is arranged on the tone arm 20 and adjacent the extremity of its rearward end portion 26 so that said second counterweight effectively acts to balance the tone arm about the third pivot means 35. The mass of the two counterweights 38 and 39 is calculated, and their locations on the support member and tone arm is determined, so as to obtain accurate balance which compensates for those extraneous forces likely to arise by accidental displacement of the phonograph as well as those expected forces which are ordinarily generated during normal operation of the phonograph.

It is to be understood that the location of the several pivots, the size and disposition of the balancing counterweights 38 and 39 and the force of the spring 37, are so chosen that the tone arm will track the record groove with the proper pressure regardless of angular position, or attitude, of the phonograph machine. In particular accordance with the invention, the balanced condition is obtained by first accurately balancing the tone arm 20 on the pivot means 35 by means of counterweight 39 and thereafter accurately balancing the support member 18 and balanced tone arm, as a unit, on pivot means 29 by means of counterweight 38.

It is especially to be noted that during the playing of a record the support member 18 and tone arm 20 will move together about pivot means 29 when the tone arm is subjected to forces causing its displacement in directions parallel to the playing surface of the record, but that the tone arm will move about pivot means 35 and with respect to the support member when the tone arm is subjected to forces causing its displacement in directions perpendicular to the playing surface of the record. In this connection it is also to be noted that during the playing of a record the pusher rod 16 and adjustable abutment 16*a* cooperate to sustain the support member 18 in position allowing the balanced tone arm to float in the aperture 25 in the front wall 24 of the support member, which aperture is appreciably larger than the cross-sectional dimension of the tone arm. Furthermore, it is especitlly to be noted that, during a record-changing cycle, when the pusher rod 16 is actuated in the direction of arrow A in FIGURE 2, the support member 18 moves in said direction about pivot means 30 and with respect to the tone arm 20 until a marginal portion 25*a* at the aforesaid opening 25 contacts the tone arm which then moves with the support member and is thereby lifted out of engagement with the record.

From the foregoing description, it will be appreciated that the present invention provides a simple yet dependable pickup-carrying assembly which is readily mountable in an automatic record-changing phonograph and which, because of its improved balanced state, makes it possible to produce sound from a phonograph record with high fidelity regardless of the angular position of the phonograph or level at which the record is being played. Moreover, it will be recognized that the provision of a pickup-carrying assembly as herein described minimizes mistracking or jumping of the stylus out of the record groove during the playing of a record, and counteracts conditions which might cause the stylus to skid across the face of the record with possible damage to the record and stylus. While a preferred embodiment of the invention has been illustrated and described, it is to be understood that the details of such embodiment are not to be construed as limitative of the invention, except insofar as is consistent with the scope of the appended claims.

What I claim is:

1. In phonograph apparatus including a mounting base, a pickup-carrying assembly comprising a support member, an elongated tone arm having a rearward portion arranged in association with the support member and a forward portion extending from the support member and provided with a pickup adapted for placement in predetermined record-engaging position, a first pivot journaled on the mounting base, a second pivot disposed perpendicularly with respect to the first pivot and connected to the first pivot and to the support member for swinging motion of the latter about both first and second pivots, a third pivot interconnecting the support member and tone arm toward the rear portion of the latter, said third pivot being generally normal to the first pivot and suspending the tone arm for rocking motion with respect to the support member, a first counterweight mounted on the support member to balance the same together with the tone arm on the first pivot, a second counterweight mounted on the rearward portion of the tone arm to balance the latter on the third pivot, and resilient means disposed between the support member and tone arm and biasing the latter on the third pivot in a direction to move the pickup to said predetermined record-engaging position.

2. Phonograph apparatus as set forth in claim 1, in which the support member has a forward portion and a rearward portion, the first pivot being journaled on the base adjacent the forward portion of the support member, the second pivot being connected to the support member adjacent its rearward portion.

3. Phonograph apparatus as set forth in claim 1, in which the support member has a forward portion and a rearward portion, the first counterweight being mounted on the support member adjacent its forward portion.

4. Phonograph apparatus as set forth in claim 1, in which the support member has a forward portion and a rearward portion, the first pivot being journaled on the base portion adjacent the forward portion of the support member, the second pivot being connected to the support member adjacent its rearward portion, and the first counterweight being mounted on the support member adjacent its forward portion.

5. Phonograph apparatus as set forth in claim 1, in which the resilient means is in the form of a spring attached to the tone arm and to the support member between the first pivot and a forwardly disposed portion of the support member.

References Cited in the file of this patent

UNITED STATES PATENTS

| | | |
|---|---|---|
| 1,883,100 | Terrell | Oct. 18, 1932 |
| 2,954,234 | Marks | Sept. 27, 1960 |
| 2,983,516 | Bauer et al. | May 9, 1961 |

OTHER REFERENCES

German published application 1,036,525, August 14, 1958.